(12) United States Patent
Krenzer et al.

(10) Patent No.: US 10,737,337 B2
(45) Date of Patent: Aug. 11, 2020

(54) MILLING TOOL

(71) Applicant: Mapal Fabrik Für Präzisionswerkzeuge Dr. Kress KG, Aalen (DE)

(72) Inventors: Ulrich Krenzer, Wolfertschwenden (DE); Marco Müller, Rot (DE)

(73) Assignee: Mapal Fabrik Für Präzisionswerkzeuge Dr. Kress KG, Aalen (DE)

( * ) Notice: Subject to any disclaimer, the term of this patent is extended or adjusted under 35 U.S.C. 154(b) by 0 days.

(21) Appl. No.: 16/078,893

(22) PCT Filed: Feb. 20, 2017

(86) PCT No.: PCT/EP2017/053806
§ 371 (c)(1),
(2) Date: Aug. 22, 2018

(87) PCT Pub. No.: WO2017/144418
PCT Pub. Date: Aug. 31, 2017

(65) Prior Publication Data
US 2019/0054549 A1    Feb. 21, 2019

(30) Foreign Application Priority Data

Feb. 26, 2016   (DE) .................. 10 2016 203 128

(51) Int. Cl.
*B23C 5/10*    (2006.01)
*B23C 3/28*    (2006.01)

(52) U.S. Cl.
CPC .................. *B23C 5/10* (2013.01); *B23C 3/28* (2013.01); *B23C 2210/0492* (2013.01);
(Continued)

(58) Field of Classification Search
CPC .............. B23C 5/10; B23C 2210/0492; B23C 2210/203; B23C 2210/40; B23C 2210/54;
(Continued)

(56) References Cited

U.S. PATENT DOCUMENTS 5,094,573 A * 3/1992 Hougen .............. B23B 51/0406
407/53
5,213,452 A * 5/1993 Kirby .................... B23C 5/1081
407/118
(Continued)

FOREIGN PATENT DOCUMENTS

DE           4335875 A1 * 3/1995 ............... B23B 5/10
DE   102014106886 A1   12/2014
(Continued)

OTHER PUBLICATIONS

International Search Report corresponding to PCT/EP2017/053806 dated May 23, 2017 (4 pages).
(Continued)

*Primary Examiner* — Nicole N Ramos
(74) *Attorney, Agent, or Firm* — Carter, DeLuca & Farrell LLP; George Likourezos (57) ABSTRACT

A milling tool is suggested having a base body (3), a central axis (M), and a front side (5), whereby at least two geometrically defined first front edges (9) that are arranged, respectively, at front side (5) of base body (3) exhibit a first edge section (13) facing central axis (M). Milling tool (1) distinguishes itself by the first edge sections (13) of the at least two front edges (9) being formed in an ascending fashion towards center axis (M), so that they form a centering tip (15), and that centering tip (15) is arranged in a recessed manner in an axial direction when compared with an axial outermost point (17) of at least two of the first front edges (9) (FIG. 1).

23 Claims, 6 Drawing Sheets

(52) U.S. Cl.
CPC .... *B23C 2210/203* (2013.01); *B23C 2210/40* (2013.01); *B23C 2210/54* (2013.01)

(58) Field of Classification Search
CPC ....... B23C 3/28; B23B 51/02; B23B 2251/14; B23B 2251/18; B23B 2251/28
See application file for complete search history.

(56) References Cited

U.S. PATENT DOCUMENTS

| | | | | |
|---|---|---|---|---|
| 6,168,355 | B1 * | 1/2001 | Wardell | B23C 5/10 407/54 |
| 7,402,004 | B2 * | 7/2008 | Tanaka | B23C 5/10 407/53 |
| 7,753,624 | B2 * | 7/2010 | Gunther | B23C 5/10 407/53 |
| 8,714,890 | B2 * | 5/2014 | Davancens | B23B 35/00 407/118 |
| 8,807,882 | B2 * | 8/2014 | Volokh | B23C 5/10 407/53 |
| 9,381,581 | B1 * | 7/2016 | Zaman | B23C 5/10 |
| 2006/0045639 | A1 * | 3/2006 | Flynn | B23C 5/10 407/54 |
| 2009/0060663 | A1 * | 3/2009 | Rouge | B23C 5/10 407/44 |
| 2010/0008736 | A1 * | 1/2010 | Matsunaga | B23C 5/10 407/54 |
| 2012/0170984 | A1 * | 7/2012 | Azegami | B23C 5/1009 407/54 |
| 2014/0003873 | A1 * | 1/2014 | Han | B23C 5/10 407/54 |
| 2014/0072378 | A1 * | 3/2014 | Zhong | B23B 51/103 407/54 |
| 2014/0126968 | A1 * | 5/2014 | Van Den Boogard | B23C 5/10 407/54 |
| 2014/0356081 | A1 * | 12/2014 | Davis | B23C 5/10 407/11 |
| 2015/0050095 | A1 * | 2/2015 | Krenzer | B23C 3/02 409/132 |
| 2015/0147127 | A1 | 5/2015 | Shpigelman et al. | |
| 2015/0251254 | A1 * | 9/2015 | Mutlu | B23C 5/10 409/131 |
| 2016/0082526 | A1 * | 3/2016 | Swift | B23C 5/28 407/11 |
| 2016/0175948 | A1 * | 6/2016 | Sakai | B23C 5/1009 407/54 |
| 2017/0304910 | A1 * | 10/2017 | Suehara | B23C 5/10 |

FOREIGN PATENT DOCUMENTS

| | | | | |
|---|---|---|---|---|
| JP | 62188616 A | * | 8/1987 | ............ B23B 51/02 |
| JP | H09309020 A | | 12/1997 | |

OTHER PUBLICATIONS

Written Opinion (English Translation)—PCT/EP2017/053806, dated May 23, 2017.

* cited by examiner

MILLING TOOL

The invention relates to a milling tool.

A milling tool originates from German patent application DE 10 2014 106 886 A1, which presents a central axis and a front side, whereby a plurality of geometrically defined front edges are arranged at the front side. These front edges descend in several sections in the direction of the central axis. This implicates that diagonal immersing, also called "ramping", is achievable with a comparatively steep immersion angle, particularly of more than 10°, when using the milling tool.

Generally, milling tools, which are designated in particular to prepare recesses such as slots or windows at work pieces, must initially be immersed in the material to be processed, before the actual milling processing can take place. Since milling tools must bear high radial stresses during the actual milling operation, they have smaller chip flutes when compared with drill tools, and they preferably have more than two cutting edges. However, it is precisely this cutter-specific geometric embodiment that prevents that a typical milling tool be suitable for an axial immersion in a work piece that is to be processed, whereby such axial immersion is also called "plunging". As cuttings cannot be safely discharged through the tight chip flutes of such type of milling tool, the chips accumulate causing excessive forces so that the sensitive front edges could burst, or whereby the entire milling tool could burst. This is why plunging is typically refrained from and the milling tools immerses diagonally under a ramp into the work piece, which is called ramping as already stated. Thereby the front edges of the milling tool are processing the work piece jointly using the circumferential cutting edges, whereby particularly the full cutting thickness, i.e., the full advance per tooth, can be in contact with the circumferential cutting edge, while a significantly lower cutting thickness abuts at the front edges—depending on the immersion angle. However, when ramping using flat immersion angles, in addition to very long chips, long process times result above all. Thus, for deep recesses, it takes a long time until the requested immersion depth is reached.

In this respect, a certain improvement results in view of the milling tool known from document DE 10 2014 106 886 A1, which in any event permits immersion angles greater than 10°. At the same time, it is particularly disadvantageous about this work piece that it is not suitable for plunging. It does not have edges in the center area so that when work piece material, which is arranged there, cannot be cut after axially immersing it. The applications of such a milling tools as well are therefore limited, and an operator must be trained in such manner that he will not exceed the immersion angle limits. In addition, the conventionally provided pre-center arrangement of the front edges causes a distinct reduction of the freedom of access, which limits a maximum achievable advance when immersing the milling tool into the material that is to be processed.

The object of the invention consists in creating a milling tool, which has advantages over prior art.

The task is solved by creating a milling tool having the characteristics of claim 1. Advantageous embodiments result from the sub-claims.

The task is solved in particular by creating a milling tool, which exhibits a base body, a central axis, and a front side, which is arranged at the base body, whereby at least two geometrically defined first front edges that are arranged at the front side of the base body, have a first cutting edge section that is facing the central axis, respectively. Whereby it is provided that the first cutting edge sections of the at least two front edges are formed such that they ascend towards the central axis so that they form a centering tip. It is further provided that the centering tip is recessed in an axial direction compared with an outermost axial point of the at least two first front edges. The milling tool has advantages compared with the state of the art. In particular, the centering tip provides stability and excellent centering characteristics to the milling tool when axially immersing so that plunging is possible using the milling tool. In particular, because the centering tip is arranged in an axially recessed manner, however, compared with an outermost point of at least the two first front edges, the milling tool can be used in the same manner as known milling tools, so that ramping continues to be possible as well, whereby the immersion angle is not limited upwards. Thus, immersions under any immersion angle, even including axial immersions, namely plungings, will be possible. Thus, the milling tool allows for working universally with any advance direction starting with axial immersions, then diagonal immersions, up to helical immersions, helix drilling, and conventionally cutting with a high performance level, respectively. Furthermore, cuttings in the area of the centering tip can be significantly more favorably shaped and broken as is the case with known geometries for milling tool. The consequence of the fact that the centering tip is arranged in an axial recessed manner is that it does not come into contact with the bottom of a created slot or groove during regular operations, particularly when slot cutting or groove cutting so that it can be created with a high surface quality and without any interfering contours.

In a preferred embodiment, the milling tool is formed as a slot cutter, in other words, it is arranged for slot cutting. Alternatively or additionally, the milling tool is preferably arranged for groove cutting and/or for window cutting. Thereby, a slot is particularly understood to be a recess introduced in a surface of a work piece, which can exhibit any geometry—particularly having any border—, whereby the recess has a bottom. In contrast, a window is understood to be a recess introduced into the surface of a work piece, which can also have any geometry and particularly any border, but no bottom, and which is formed especially as a continuous recess that penetrates the work piece. In turn, a slot is understood to be a recess introduced into the surface of a work piece, which has a first extension along a direction, which is significantly larger than a second extension in another direction, which is perpendicular to the first direction, whereby the first extension more particularly accounts for a multiple of the second extension. A groove exhibits a length in particular, which is greater than its width. The groove exhibits a bottom by preference.

A central axis of the milling tool is understood to be an axis with respect to which the milling tool particularly exhibits a rotational symmetry in the majority, whereby the central axis represents an axis around which the milling tool revolves as intended when cutting.

A front side is understood to be a side of the milling tool, which, as intended, faces a work piece that is to be processed, and which particularly processes a bottom of a recess of the work piece that is being created during the cutting operation as appropriate.

A geometrically defined edge is particularly understood to be an edge, which is formed as a cutting edge, and which exhibits a defined geometric shape and/or extension, particularly in contrast to a geometrically non-defined edge, as it would be formed for instance on an abrasive grain.

An axial direction is generally understood to be a direction which extends parallel to the central axis. A radial direction is understood to be a direction which is perpendicular on the central axis and which cuts the central axis. A circumferential direction is understood to be a direction which encompasses the central axis—particularly concentrically.

The fact that the first edge sections are formed in a manner that is increasing towards the central axis, means in particular that they ascend radially inwards along their development on the central axis in an axial direction, i.e., when the milling tool is arranged as intended, they are inclined relative to a work piece towards the work piece. The first edge sections that are increasing towards the central axis thus form an elevation, namely the centering tip.

The fact that it is recessed in an axial direction, compared with an outermost axial point of the at least two first front edges, means in particular that it is arranged relative to a work piece further away from a work piece surface than the axial outermost point of at least two of the first front edges—when viewed along the central axis—when the milling tool is arranged as intended. The axial outermost point of the at least two first front edges preferably represents a point in particular, which axially protrudes at the base body of the milling tool the furthest in the direction of a work piece that is to be processed. In particular, the centering tip is preferably arranged with its locally highest point in an axially recessed manner compared with the axial outermost point of at least two first front edges. Thus, the milling tool preferably exhibits a recess or indentation at the front side, in which the centering tip is arranged in a quasi immersed manner.

The centering tip is preferably arranged in a recessed manner in an axial direction compared with an axial outermost circumferential line of the base body. It is possible thereby that the axial outermost point of the two first front edges is arranged on the axial outermost circumferential line of the base body.

The front side of the milling tool is preferably formed concavely, whereby it exhibits the already mentioned recess or indentation, in which the centering tip is arranged—particularly in a quasi-immersed manner.

The milling tool preferably exhibits a shaft section, with which it can be clamped for instance in the chuck of a machine tool. The term "ascend" then particularly refers to a direction away from the shaft section and toward the front side, while the term "arranged in a recessed manner" particularly refers to a direction away from the front side and towards the shaft section.

The first front edges preferably exhibit a second edge section, respectively, which is radially arranged outside of the first edge sections, in other words, further towards an external circumference of the base body. Therefore, the first edge sections are radially arranged inside when compared with the second edge sections, while the second edge sections are arranged radially outside relative to the first edge sections.

The first edge sections preferably extend radially up to the height of the center axis; in other words, up to a center of the milling tool.

In accordance with a continued formation of the invention, it is provided that the second edge sections of the first front edges, which are facing away from the central axis, ascend in the direction of an imagined circumferential line of the base body. This means in reverse that the second edge sections are formed towards the central axis in a slanting manner. Altogether this results—together with the increasing development of the first edge sections towards the central axis—in a concave embodiment of the front side, whereby the recess or indentation, in which the centering tip is arranged, is formed through the development that is slanting towards the central axis of the second edge sections. In the radial development of the first front edges—when viewed in an axial direction—a minimum in a transition area results in particular between the first edge sections and the second edge sections, to which they preferably return—when viewed in a radial direction to the central axis—from the slanting development of the second edge sections, and continue to ascend towards the central axis in the area of the first edge sections.

In accordance with a continued formation of the invention, it is provided that the second edge sections ascend in an arched manner convexly in the direction of the imagined circumferential line. Thereby an angle preferably continues to decrease steadily towards the central axis, which the second edge sections enclose with the central axis. Therefore, particularly when diagonally immersing, thus when ramping, an arched curved development of the edges results, which causes an interruption of the chip formation and consequently provides for short cuttings, which can be easily removed. An accumulation of chips can hence be avoided. In addition, cutting angles of the milling tool as opposed to a conventional hollow grinding of the front side using straight edge developments can be developed in a rather stable manner, as the arched development allows for a super-elevation—when measured in an axial direction—of the front edges in the area of the cutting angles compared with a linear geometry.

The centering tip is preferably arranged in a recessed manner—when viewed in an axial direction—also with respect to the cutting angles of the first front edges, and preferably with respect to the cutting angles of all front edges of the milling tool. Thereby the cutting angles are the radially outermost ones in particular; in other words, points or areas of the front edges that are arranged the furthest away from the central axis. It is possible that the cutting angles form or exhibit the axial outermost points of the front edges. But it is possible as well that the axial outermost points of the front edges—when viewed in a radial direction—are arranged in an offset manner towards the central axis when compared with the cutting angles, so that the front edges in the second edge sections descend towards the cutting angles in certain areas—when viewed from their axial outermost points.

The first front edges are preferably formed in the area of the second edge sections in particular—but also particularly preferably altogether—at least in certain areas and in such a fashion that their work angle to the center axis—here particularly an angle between a tangent and a point on a front edge and a diameter line of the milling tool through the same point—continually decreases towards the central axis. Thus in plan view onto the front side a preferably arched configuration of the first front edges results as well when viewed at least in certain areas.

In accordance with a continued formation of the invention it is provided that the first front edges pass through a minimum in a transition area between the first edge sections and the second edge sections—when viewed in a radial direction. This had been explained previously, whereby this embodiment facilitates a concave geometry at the front side overall, and whereby the centering tip can be arranged in a recess or indentation.

In accordance with a continued formation of the invention, it has been provided that first cutting faces are assigned to the first edge sections of the first front edges. Second cutting faces are assigned to the second edge sections of the first front edges. In particular, a first cutting face is assigned to a first edge section, whereby a second cutting face is assigned to a second edge section. The first cutting faces and the second cutting faces of a first front edge comprise between them an angle differing from 0° at least in certain areas. In particular, they are consequently tilted differently. Should a first front edge of both first front edges particularly exhibit a first edge section with a first cutting face, and a second edge section with a second cutting face, this first cutting face and this second cutting face comprise at least in certain areas an angle between them that is different from 0°. This preferably applies in the exact same manner to a second first front edge of the at least two first front edges as well. In a particularly preferred manner this applies to each first front edge of the milling tool. This geometric embodiment is preferably effected in particular by that the first cutting faces and the second cutting faces are formed by tips that are independent from each other. It has been particularly preferably provided that the centering tip be formed with the first cutting faces through a drill-type tip, whereby the second cutting faces of the second edge sections are generated through independent tips that are separate therefrom. The centering tip preferably corresponds to the tried and tested drill bits that are basically known and also known in view of their stabilizing effect, and their centering characteristics.

In accordance with a continued formation of the invention, it is provided that at least one second edge section of the second edge sections of the first front edges exhibits a position below the center—when viewed in plan view on the front side. Consequently, this is particularly arranged in a recessed manner when compared with an imagined diameter line of the milling tool, which essentially extends parallel to the development of the second edge sections against a rotational direction of the milling tool as intended—when viewed in a circumferential direction. The position below the center allows—particularly when compared with a pre-center position as provided by prior art—for enhanced freedom of access, which constitutes an essential requirement in order to achieve high advance values for the milling tool. All second edge sections of the first front edges preferably exhibit such type of position below the center.

In accordance with a preferred embodiment, it has been provided that the position below the center of at least 0.2% will not exceed 2%, preferably of at least 0.5% will not exceed 1.5% of the milling tool's diameter in the area of the front side—particularly when measured as the diameter of a flight circle of the cutting angles.

In accordance with a continued formation of the invention it has been provided that at least one of at least two of the first front edges will change over to a circumferential edge, which is arranged at a circumference of the base body. A circumferential edge is preferably assigned to this first front edge into which it changes over—particularly in the area of a cutting angle. The circumferential edge is particularly formed as geometrically defined edges. Preferably each first front edge is appropriately assigned to a circumferential edge.

In accordance with a continued formation of the invention, it has been provided that at least the first front edge changes over via an arched configuration in the circumferential edge assigned to it. Each first front edge preferably exhibits in the change-over area an arched configuration in the circumferential edge assigned to it. Whereby an arched configuration is especially a curved configuration. The first front edges and the circumferential edges assigned to them preferably exhibit a continuous cutting edge, respectively, which changes over continuously along the front edge via the transition area into the circumferential edge, where it proceeds along the circumferential edge. Whereby the cutting edge in the transition area between the front edge and the circumferential edge exhibits a curved configuration. At least one radius has been provided particularly in the transition area between the front edge and the circumferential edge. It is possible that a plurality of radii are provided in the transition area. It is particularly possible that a radius configuration has been provided such that the curvature's configuration of the cutting edge changes—preferably continuously—in the transition area. The curved configuration—of the cutting edges in the area of the cutting angles leads to a further improvement of the basic stability of the cutting angles, which is high in any case, which is obtained particularly by means of the arched convex configuration of the second edge sections.

A highest point of the centering tip is axially preferably arranged in a recessed manner particularly with respect to an axially highest point of the transition area between a first front edge and the circumferential edge assigned to it.

In accordance with a continued formation of the invention it has been provided that more than two circumferential edges have been arranged at the circumference of the base body. It is categorically possible that a first front edge be assigned to each circumferential edge.

However, an embodiment is also preferred, whereby it is provided that at the front side of the base body at least a second, geometrically defined front edge be provided that changes over into one of the circumferential edges, whereby at least one second front edge ends in a second edge section. In particular, this means that the second front edge ends before reaching the radial internal area of the first edge sections of the at least two first front edges. It thus does not particularly exhibit a first edge section, but merely a radial external, second edge section. In other words, this means in particular that not all circumferential edges of milling tool 1 are guided after their passage in a front edge up to the milling tool's center. The advantage of this is that more space is available for the cuttings that get skimmed from the front edges—particularly when plunging—in the area of the front side. At the same time, the milling tool—as typically provided in milling applications—can exhibit a number of circumferential edges that is considerably greater than two, without this leading in the area of the front side to insufficient space for the cuttings that are skimmed there.

In accordance with a continued formation of the invention, it has been provided that the milling tool exhibits a minimum of four circumferential edges and exactly two first front cutting edges. It is also possible that the milling tool exhibits a minimum of four circumferential edges and exactly three first front cutting edges. As already stated, each circumferential edge of the milling tool changes over into a front edge, whereby not all front edges are formed as first front edges, however, but rather a certain number of front edges can be formed as second front edges, whereby the second front edges do not exhibit a first edge section, but rather end in the second edge section. Only a sub-selection of all front edges that are assigned, respectively, to circumferential edges will then be guided up to the center of the milling tool and will exhibit a first edge section, and is consequently formed as a first front edge.

Particularly preferred is an example of an embodiment of the milling tool, whereby exactly four circumferential edges are provided. Furthermore, an example of an embodiment of the milling tool is preferred, whereby exactly five circumferential edges are provided. Furthermore, an example of an embodiment of the milling tool is preferred, whereby exactly six circumferential edges are provided. An example of an embodiment of the milling tool is particularly preferred, whereby exactly four circumferential edges are provided, and whereby the milling tool exhibits exactly two first front cutting edges. Each of the four circumferential edges changes over to a front edge, of which only two front edges are formed as first front edges, however. The remaining two front edges are then formed as second front edges. Furthermore, an example of an embodiment of the milling tool is preferred, whereby exactly five circumferential edges are provided, and whereby exactly two first front edges are provided. In this case three second front edges are provided accordingly. Likewise, an example of an embodiment of the milling tool is preferred, whereby exactly six circumferential edges are provided. In this example of an embodiment, exactly three first front edges are provided, so that the remaining three front edges are formed as second front edges. Furthermore, an example of an embodiment of the milling tool is preferred, whereby exactly three circumferential edges are provided, whereby a first front edge is assigned to each circumferential edge, so that exactly three first front edges are provided, whereby the milling tool does not exhibit a second front edge.

As already stated, each circumferential edge preferably changes over into a front edge, whereby each transition from a circumferential edge into a front edge—or inversely from a front edge into a circumferential edge—preferably exhibits an arched configuration, and a minimum of one radius at the passage in particular. This applies particularly independently from the fact, whether a front edge that was assigned to a circumferential edge is formed as a first front edge or as a second front edge.

In accordance with a continued formation of the invention, it is provided that at least one of the first edge sections of the at least two first front edges, preferably all first edge sections, exhibits/exhibit a pre-center position—in plan view. Accordingly, a first edge section of the first front edges, which forms the centering tip, consequently particularly exhibits a pre-center position. It thus leads—when viewed in the milling tool's rotational direction—a diameter line of the milling tool that is at least essentially aligned parallel to the first edge section. This proves to be favorable for the chipping characteristics of the milling tool in the area of the centering tip, particularly when plunging.

The pre-center position of at least a first edge section is preferably at least 0.5% up to a maximum of 4%, particularly preferably at least 1% up to a maximum of 3% of the milling tool's diameters in the front side area, particularly of the diameter of a flight circle defined by means of the cutting angles.

In accordance with a continued formation of the invention it is provided that the front edges—particularly the first front edges as well as the second front edges—are assigned to a chip flute, respectively, whereby a cross-section—that is measured perpendicularly to the central axis—of at least one of the chip flutes—preferably of all chip flutes—is greater in the area of the front side than in an area of the milling tool, which is facing away from the front side. An area of the milling tool that is facing away from the front side is particularly an area that is facing the shaft section of the milling tool. As a result of the chip flutes being preferably formed in larger sizes in the area of the front side than in the area facing away from the front side, they are able to more easily absorb and remove cuttings that are skimmed there— particularly when plunging—without that an accumulation of chips needs to be feared. It is particularly possible to form the cross-section of the chip flutes in the area of the front side in a larger fashion than this is the case with conventional milling tools.

It is feasible that the cross-section of the chip flutes exhibits in their development from the front-side area to the area facing away from the front side a volatile and/or not-distinguishable configuration, particularly a step or a kink. It is particularly preferred that the cross-section diminishes while the distance to the front side increases, thus exhibiting a cross-section configuration that is dependent on the distance to the front side, and which can be formed in a graduated, but also in a continuous fashion which is particularly preferred. In particular, the cross-section preferably decreases continuously with the distance to the front side. Such type of cross-section configuration of the chip flutes is also called core rise.

In accordance with a continued formation of the invention it is provided that the circumferential edges at the base body are arranged with unequal separation angles. This means that the circumferential edges—when viewed in a circumferential direction—exhibit different angle distances to each other, i.e., they are not distributed symmetrically along the circumference. Because of this, vibrations and chatter vibrations during the milling process can be dampened and preferably avoided.

In accordance with a continued formation of the invention, it is provided that at least two of the circumferential edges exhibit unequal angles of twist. The circumferential edges preferably run along the screw lines at a certain angle of twist, whereby this angle of twist has been selected differently for at least two of the circumferential edges. It is possible that more than two circumferential edges exhibit different angles of twist. It is possible, in particular, that no two circumferential edges exhibit the same angle of twist, whereby then all angles of twist of the circumferential edges are different in pairs in particular. The selection of unequal angles of twist for the circumferential edges also allows for an attenuation or even avoidance of vibrations and chatter vibrations during the milling processing.

It is emphasized that in accordance with a preferred embodiment of the milling tool, the second front edges are formed such at least with respect to a characteristic, preferably with respect to all previous described characteristics, as was described regarding the first front edges with respect to the second edge section. This applies most particularly to the arched convexly running ascent to the imagined circumferential line of the base body, as well as for the work angle that continuously decreases towards the central axis, which leads—when viewed in plan view on the front side—to an arched configuration of the second front edges at least in certain areas.

Furthermore and particularly preferably, the second front edges exhibit a position below the center.

By the way, milling processing is especially understood as processing a work piece, whereby the milling tool is revolved around its central axis and is shifted relative to the work piece perpendicularly to its central axis. It does not matter in this case whether the milling tool is shifted, whereby the work piece is arranged in a fixed manner, or whether the work piece is shifted, whereby the milling tool is arranged in a fixed manner, or whether the milling tool as well as the work piece are shifted perpendicularly to the central axis. All these shift combinations are feasible. Ultimately, what is important is that a relative shift between the work piece and the milling tool be achieved, which runs perpendicularly to the central axis of the milling tool. The initial immersion of the milling tool into the work piece—be it through plunging, through ramping, or in another suitable manner—serves to bring the milling tool into a suitable processing position for a subsequent milling processing to form a slot or a window at the work piece for instance. The actual milling processing then preferably occurs without an axial shift of the milling tool relative to the tool, but rather exclusively through the described relative shift perpendicular to the center axis. This differentiates milling processing from drill processing in particular. The milling tool suggested here has been especially specifically arranged for milling processing of work pieces.

The invention will be explained in more detail further below by means of the drawing. Whereby it is shown.

Figure 1:
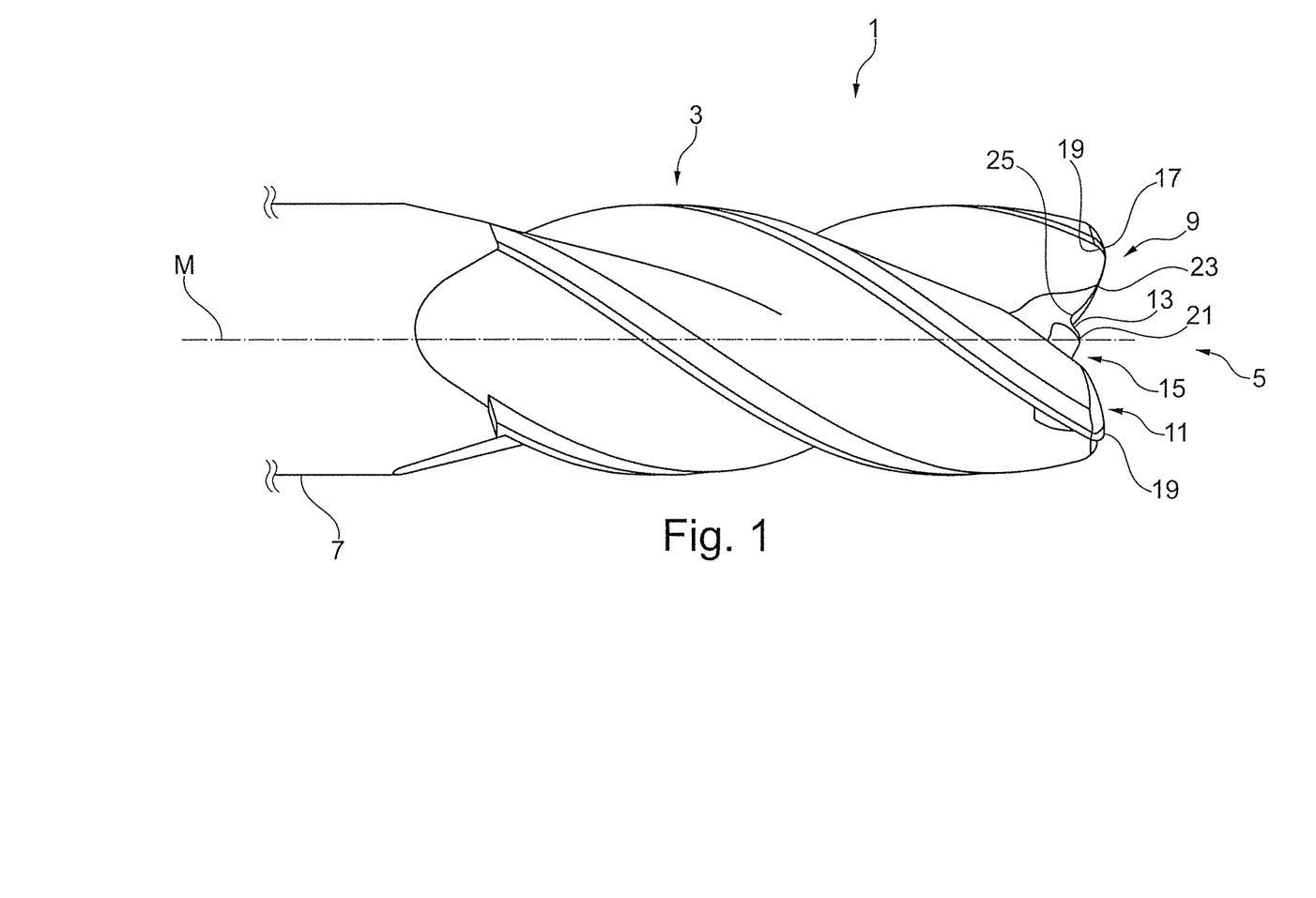
FIG. 1 a schematic lateral view of a first example of an embodiment of a milling tool.

FIG. 1 shows a lateral view of a first example of an embodiment of a milling tool 1, which is specifically formed for milling processing and particularly for slot cutting. Milling tool 1 exhibits a base body 3 as well as a central axis M, and also a front side 5, which is facing the work piece as intended during milling processing of a work piece. Facing away from front side 5—along central axis M—base body 3 exhibits a shaft section 7, which is arranged particularly to clamp milling tool 1 in a work piece machine, particularly in a chuck.

Milling tool 1 exhibits at front side 5 at least two, exactly two geometrically defined first front edges 9 in this case, whereby in the depiction in accordance with FIG. 1 only a first front edge 9 is shown, whereby the second first front edge 9 is covered. Discernible from the perspective of a viewer of FIG. 1 and thus depicted in FIG. 1 is a first second front edge 11, whereby the example shown here of an embodiment of milling tool 1 exactly exhibits two second front edges 11, of which the second front edge 11 is not depicted in FIG. 1, however, but rather it is covered. Likewise, the second front edges 11 are formed as geometrically defined edges.

First front edges 9 exhibit a first edge section 13, which is facing central axis M, respectively, which is formed in an ascending fashion towards central axis M, in other words, radially towards the interior, to be viewed to central axis M, pointing away from shaft section 7. Herewith centering tip 15 is formed at front side 5. In its embodiment this centering tip 15 corresponds particularly to a drill bit and is preferably generated through a drill-type tip at milling tool 1. Different from a drill tool, centering tip 15 is arranged in a recessed manner, however, compared to an axial outermost point 17 of front side 5—when viewed in an axial direction—, thus arranged further to shaft section 7 when compared to axial outermost point 17. Front side 5 preferably thereby exhibits not only an axial outermost point 17, but rather an axial outermost point 17 is preferably provided at each edge 9, 11 particularly at the same axial level, whereby an imagined circumferential line connects these axial outermost points 17 with each other. Centering tip 15 is arranged in a recessed manner particularly when compared to this imagined circumferential line. In addition, centering tip 15 is preferably arranged in an axially recessed manner against cutting angles 19 of front edges 9, 11 as well. In particular, a highest point 21 of centering tip 15 is preferably arranged in an axially recessed manner compared to axial outermost point 17 and preferably also to cutting angles 19. This ensures that during the actual milling processing and also, if applicable, during a diagonal immersion, particularly when ramping, centering tip 15 does not interfere with the material of a work piece. Rather, centering tip 15 is preferably brought particularly during vertical immersions along central axis M, particularly when plunging, in interference with the processed material of a work piece so as to be also able to cut it by chip removal in the center of milling tool 1.

Through centering tip 15, milling tool 1 is suitable for an immersion into a work piece even when using very steep immersion angles, and particularly when plunging, whereby centering tip 15 provides milling tool 1 with a high stability and excellent centering characteristics. Furthermore, cuttings in the area of centering tip 15 are rather favorably shaped and broken, so that they can be removed from this area without further ado. Thereby there exists no risk of an accumulation of chips and thus of a breakage of front edges 9, 11, or even of the entire milling tool 1.

Based on FIG. 1 it also becomes clear that front side 5 is concavely formed on the whole, and that it exhibits a recess or indentation in which centering tip 15 is arranged.

Furthermore, it also becomes obvious based on FIG. 1 that first edge section 13—when viewed in a radial direction—extends up to the level of central axis M. The first front edges 9 exhibit a second edge section 23, respectively, which is facing away from central axis M, and which ascends in the direction of an imagined circumferential line of base body 3. This means inversely that second edge section 23 descends in the direction of central axis M. In particular, second edge section 23 runs—when viewed in a radial direction to central axis M—in the direction of shaft section 7. In particular, second edge section 23 ascends in an arched convex fashion up to the imagined circumferential line of the base body, exhibiting in other words a curved development. In particular the concave embodiment results on the whole of front side 5 with the indentation in which centering tip 15 is arranged. The arched configuration of second edge section 23 makes for the area of cutting angles 19 being able to manifest more material than with a linearly ascending configuration, because an elevation of second edge section 23 through the arched bend exists effectively in the area of cutting angle 19. Cutting angles 19 can thus exhibit high stability, which can be further increased by means of additional radii at cutting angle 19. The arched convex configuration of second edge section 23 additionally provides the advantage that particularly in cases of diagonal immersions, and most particularly when ramping, an interruption of the chip creation exists, so that short cuttings are created.

Likewise, second front edges 11 preferably exhibit an appropriate arched convex configuration that ascends towards an imagined circumferential line of base body 3. Thereby the same advantages that had been explained for first front edges 9 are realized in connection with second front edges 11, particularly in view of the creation of chips, and the stable embodiment of cutting angles 19.

First front edges 9 pass through a minimum 25 in a transition area between first edge section 13 and second edge section 23—when viewed in a radial direction. In minimum 25, the configuration of first front edges 9 reverts in particular, whereby they descend in the area of second edge section 23 towards central axis M and ascend in first edge section 13 towards central axis M. Minima 25 of first front edges 9 form the indentation in particular, in which centering tip 15 is arranged.

Figure 2:
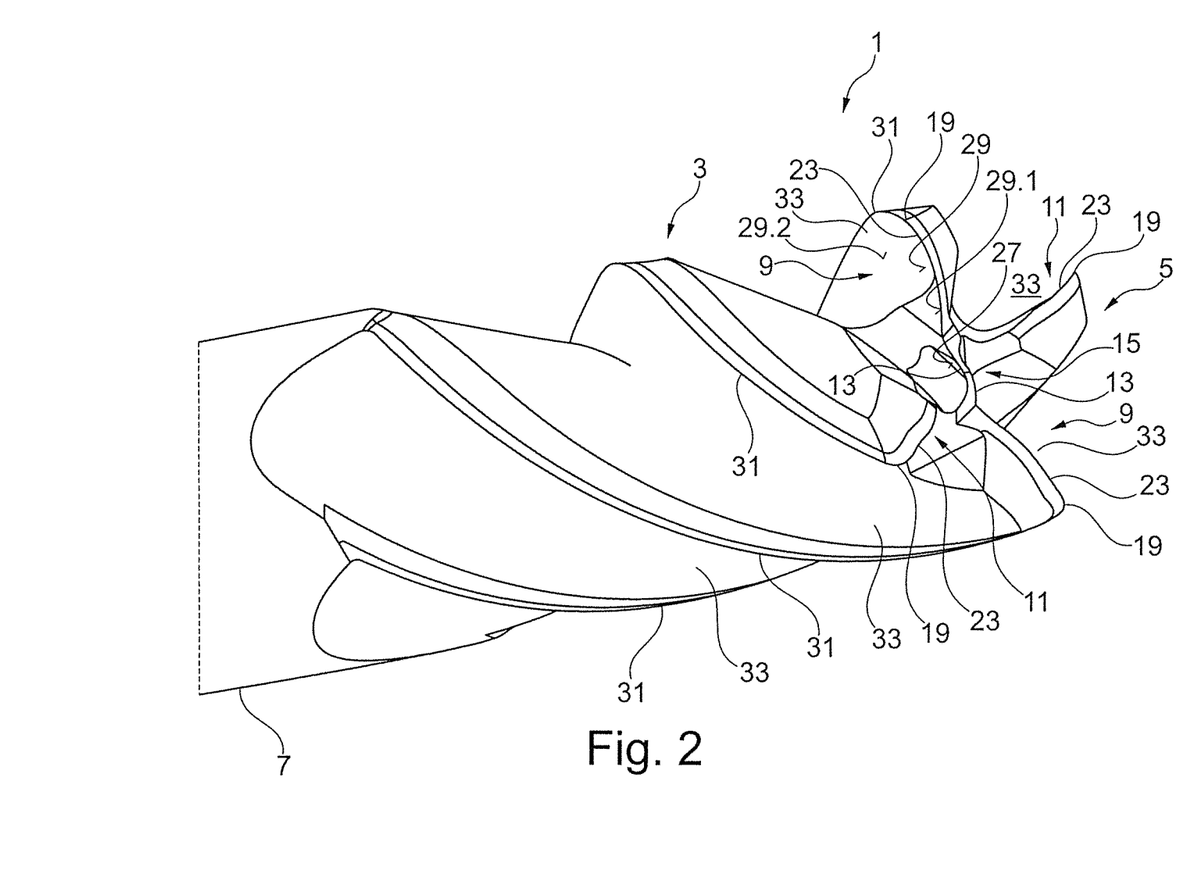
FIG. 2 a perspective view of the first example of an embodiment in accordance with FIG. 1.

FIG. 2 shows a perspective view of the first example of an embodiment of milling tool 1 in accordance with FIG. 1. Any same and functionally same elements are provided with the same reference characters, so that reference is made to the previous description in this respect. FIG. 2 shows that a first cutting face 27 is assigned to first edge section 13 of each first front edge 9, whereby a second cutting face 29 is assigned to second edge section 23. Thereby first cutting face 28 and second cutting face 29 comprise an angle between them at least in certain areas, which differs from 0°. In particular, first cutting face 27 and second cutting face 29 are produced independently from each other by means of separate tips. It also shows that second cutting face 29 exhibits two cutting edge areas in the example of an embodiment represented here, namely a first cutting edge area 29.1 and a second cutting edge area 29.2. Thereby particularly first cutting edge area 29.1 of second cutting face 29 as well as first cutting face 27, respectively, are created by means of a tip, whereby these tips are provided independently from each other.

By reference to FIG. 2 it also shows that second front edges 11 only exhibit second edge section 23, but no first edges section. In particular, second front edges 11 end in second edge section 23 and are insofar not guided up to the center of milling tool 1. Centering tip 15 is thus exclusively formed by first front edges 9. This creates more room in the center of front side 5 for cuttings created there.

Front edges 9, 11 change over here, respectively, in circumferential edges 31 that are arranged at the circumference of base body 3. Thereby an arched configuration for the passage in the area of cutting angles 19 is provided in particular—thus a curved development—which exhibits at least one radius. This provides for an increased stability in the area of cutting angles 19.

It can also be seen on the basis of FIG. 2 that front edge 9, 11 is assigned to each circumferential edge 31. Thereby a first front edge 9 is not assigned to every circumferential edge; rather a first front edge 9 is assigned to two circumferential edges 31, respectively, whereby a second front edge 11 is assigned to the two other circumferential edges 31, respectively. Ultimately, not all circumferential edges 31 will be guided on the font side via the front edges up to the center of milling tool 1. Rather, several of circumferential edges 31, in this case exactly two thereof, radially end in a front edge outside of the center of milling tool 1.

It is clearly discernible that the first example of an embodiment depicted here exhibits exactly four circumferential edges 31 and exactly two first front edges 9. Accordingly, this example of an embodiment of milling tool 1 exhibits exactly two second front edges 11.

A chip flute 33 is assigned to each front edge 9, 11, respectively. Chip flutes 33 exhibit a cross-section—measured on a level, on which central axis M is standing perpendicularly—, which is greater in the area of front side 5 than in an area of milling tool 1, which is facing away from the front side and which is particularly facing shaft section 7. It is preferred that chip flutes 33 exhibit a continuous cross-section development, whereby the cross-section continuously decreases while the distance to front side 5 increases. It is therefore particularly possible to form larger chip flutes 33 in the area of front side 5 than is the case with conventional milling tools, so that particularly in the case of steep immersions, especially when plunging, cuttings can be absorbed and removed efficiently, without there existing the risk of an accumulation of chips and of a rupture of front edges 9, 11 and/or of milling tool 1. Such type of cross-section development of the chip flutes is also described as core increase.

It further shows that chip flutes 33 exhibit a screw-line shaped, coiled or spiral-shaped configuration. Accordingly, circumferential edges 31 exhibit a screw-line-shaped, spiral-shaped, or coiled development. Thereby it is preferably provided that at least two of circumferential edges 31 exhibit unequal angles of twist. Particularly preferably all circumferential edges 31 exhibit different angles of twist in pairs.

Furthermore, it is advantageously provided that circumferential edges 31 at base body 3 are arranged with unequal separation angles. Unequal separation angles between circumferential edges 31 as well as unequal angles of twist provide for an efficient attenuation of vibrations and chatter vibrations when milling processing a work piece.

Figure 3:
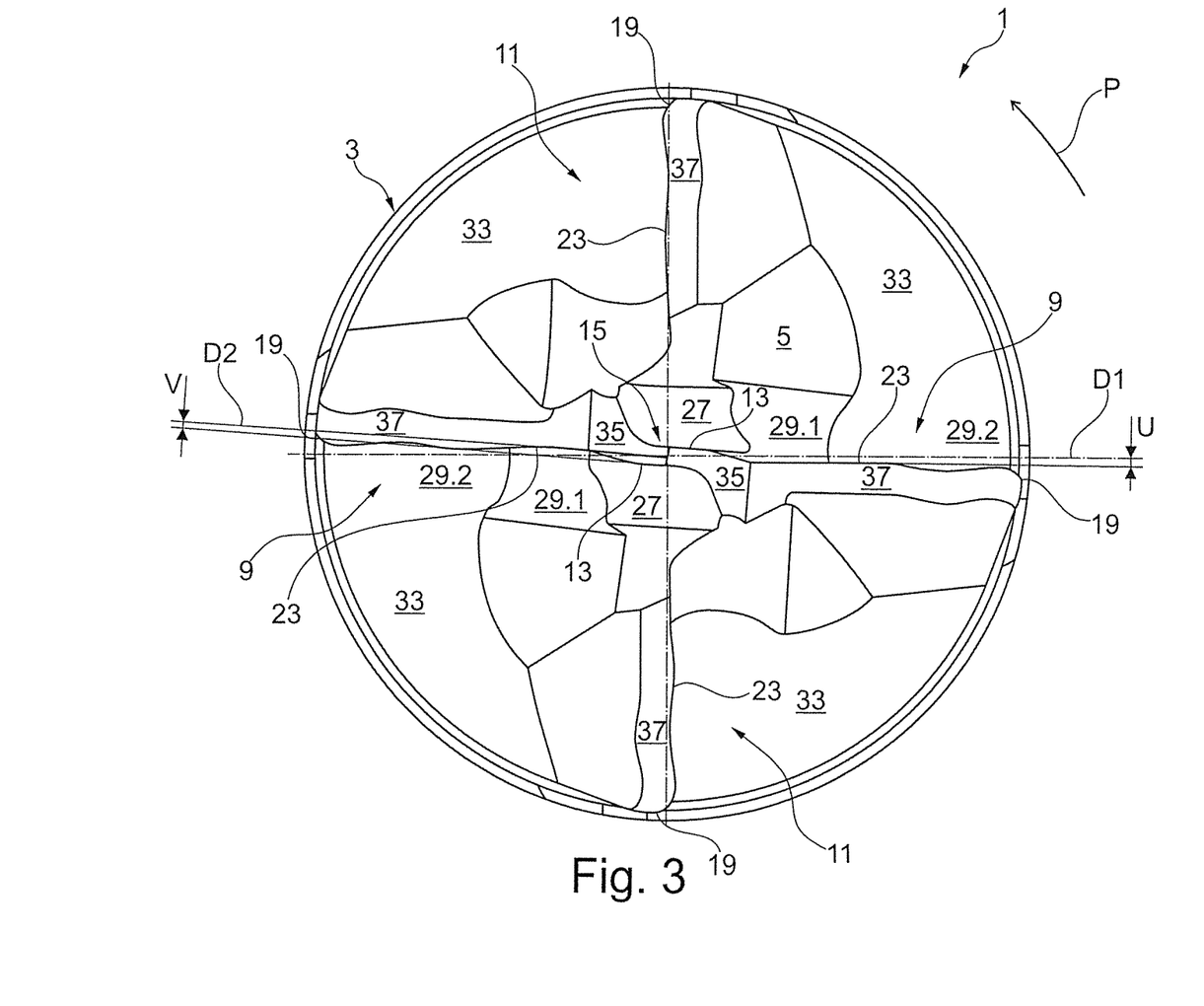
FIG. 3 a front plan view on the example of an embodiment in accordance with the FIGS. 1 and 2.

FIG. 3 shows a plan view onto front side 5 of the first example of an embodiment of milling tool 1 in accordance with FIGS. 1 and 2. Any same and functionally same elements are provided with the same reference characters, so that reference is made to the previous description in this respect. FIG. 3 particularly depicts that second edge sections 23 of first front edges 9—when viewed in plan view onto front side 5—exhibit a position below the center, whereby they particularly—when viewed in the rotational direction of milling tool 1 around central axis M depicted with arrow P—follow diameter line D1 that runs essentially parallel to second edge sections 23, in other words they are arranged in a recessed manner relative to diameter line D1—when viewed in the circumferential direction contrary to rotational direction P. Hereby results an increased freedom of access by means of which high advance values are achievable, particularly when immersing milling tool 1 in the material of the work tool to be processed, and most particularly, when plunging.

The position below center U is preferably at least 0.2% up to a maximum of 2%, preferably of at least 0.5% up to a maximum of 1.5% of milling tool 1's diameter in the area of front side 5, whereby the diameter is preferably measured as the diameter of a flight circle of cutting angles 19.

By contrast, first edge sections 13 of first front edges 9 exhibit—when viewed in plan view onto front side 5—pre-center position V. They thereby speed—when viewed in rotational direction P of milling tool 1—before a second diameter line D2 extending essentially parallel to first edge sections 13. The pre-center position is preferably at least 0.5% up to a maximum of 4%, preferably at least 1% up to a maximum of 3% of the diameter of milling tool 1.

It can further be seen by means of FIG. 3 that the first front edges 9 are formed such and particularly in the area of second edge sections 23—but preferably also altogether—at least in certain areas that their work angle to central axis M, here particularly an angle between a tangent to a point on a front edge 9 and a diameter line of milling tool 1 through the same point, continuously decrease towards central axis M. Thus appears as a result a preferably arched configuration of first front edges 9 at least in certain areas even when viewed in plan view onto front side 5. It is preferred that the same applies to the second front edges 11 as well.

Figure 4:
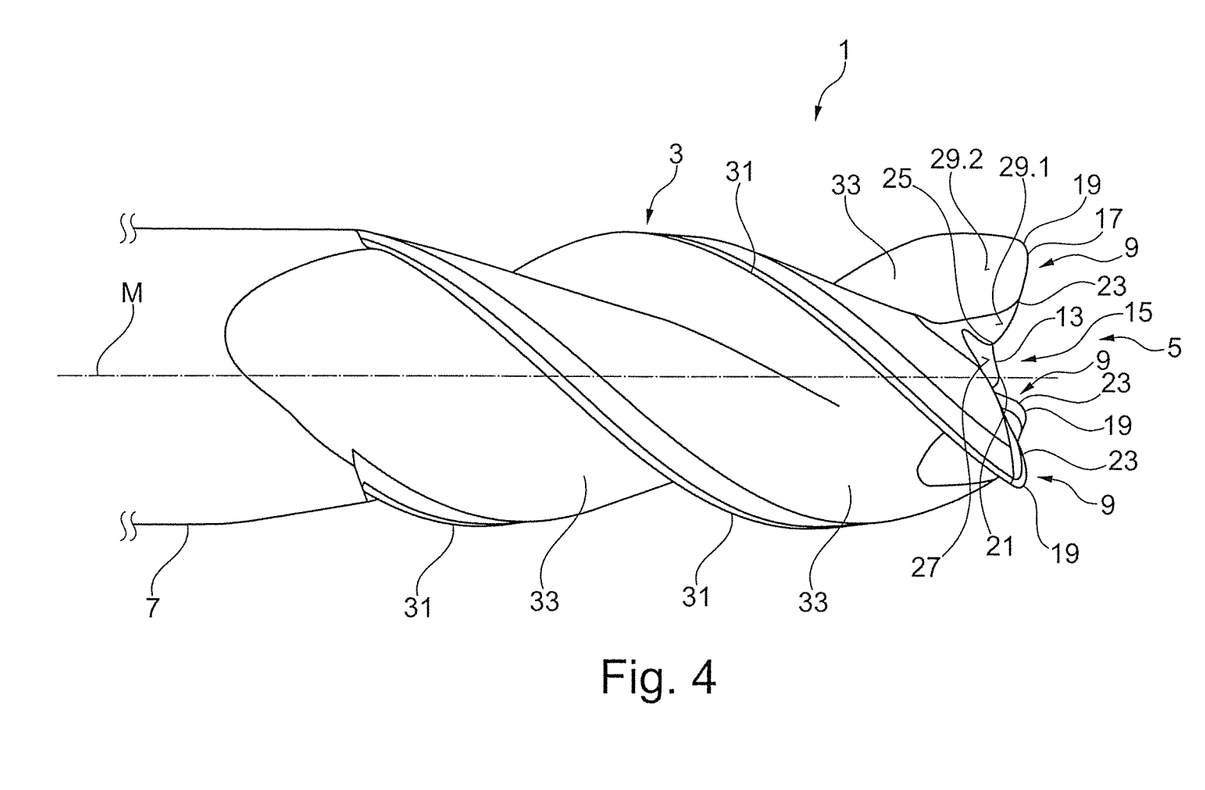
FIG. 4 a lateral view of a second example of an embodiment of the milling tool.

FIG. 4 shows a lateral view of a second example of an embodiment of milling tool 1. Any same and functionally same elements are provided with the same reference characters, so that reference is made to the previous description in this respect. The second example of an embodiment of milling tool 1 depicted here exhibits exactly three first front edges 9, and no second front edge. A circumferential edge 31 is assigned to each first front edge 9, whereby the first front edges 9 change over, respectively, in circumferential edges 31 via an arched configuration in the area of cutting angles 19. Front edges 9 exhibit, respectively, first edge sections 13, which are formed in a gradient manner towards central axis M, so that centering tip 15 will be formed. Thereby it is formed by the three first edge sections 13 of the three first front edges 9 in this case. Here, too, it can be seen that centering tip 15 is arranged in a recessed manner in an axial direction when compared with an axial outermost point 17 of front edges 9. In addition, the first front edges 9 exhibit, respectively, a second edge section 23, which is facing away from central axis M, which ascends to an imagined circumferential line of base body 3, whereby it ascends particularly in an arched convex fashion to the imagined circumferential line. Thereby first front edges 9 exhibit minimum 25 in a transition area between first edge section 13 and second edge section 23—when viewed in a radial direction, which they pass through.

In this case, first cutting faces 27 are also assigned first edge sections 13, whereby second cutting faces 29 are assigned to second edge sections 23, whereby first cutting faces 27 and second cutting faces 29 of each front edge 9 together comprise an angle different than 0°, respectively, at least in certain areas, particularly in view of cutting edge area 29.1 of second cutting faces 29. Whereby in this case as well, second cutting faces 27 on the one hand and first cutting edge areas 29.1 of second cutting faces 29 are formed preferentially through independent tips in particular.

Figure 5:
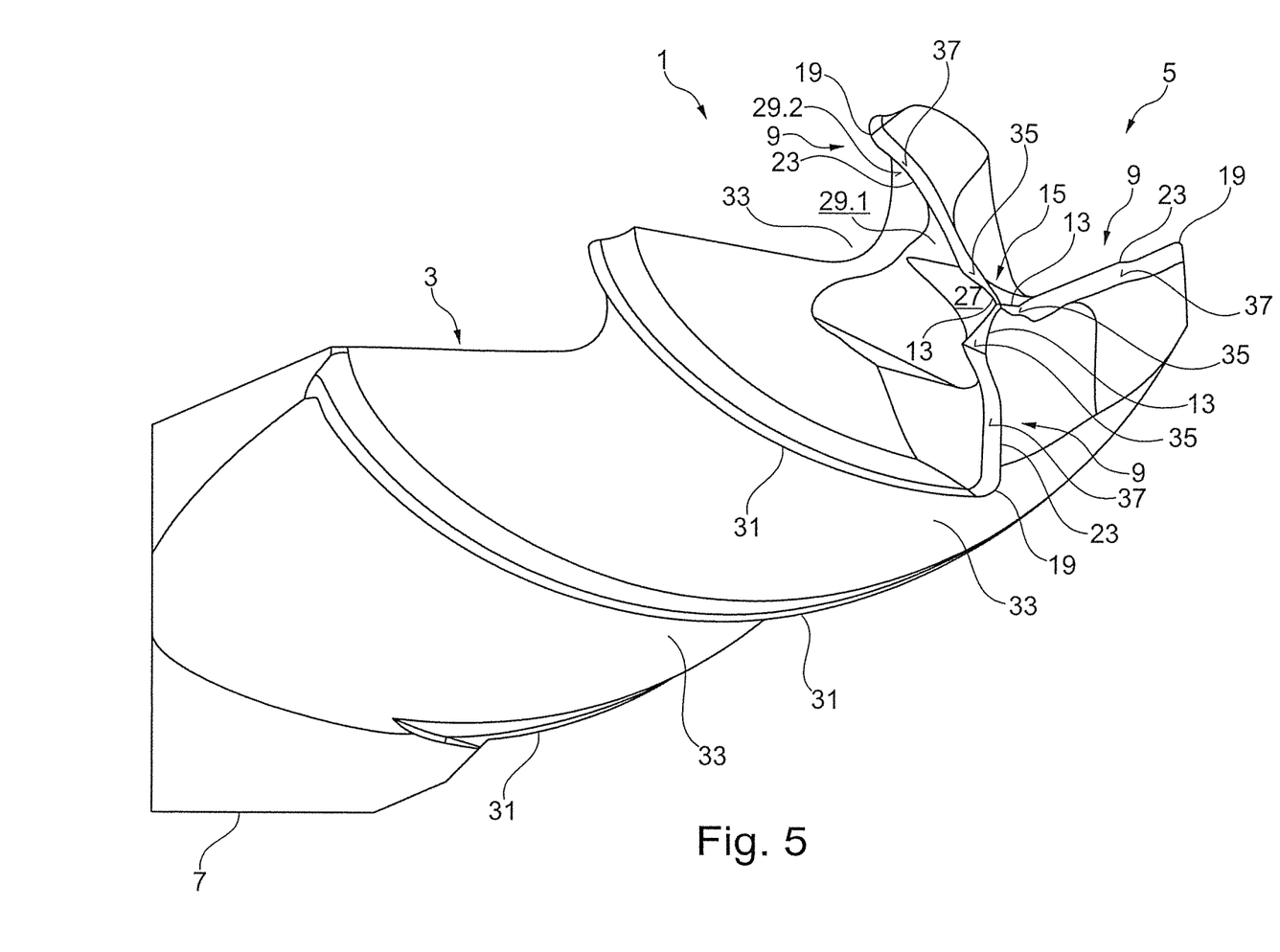
FIG. 5 a perspective view of the second example of an embodiment in accordance with FIG. 4, and FIG. 6 a front plan view of the second example of an embodiment in accordance with FIGS. 4 and 5.

FIG. 5 shows a perspective view of the second example of an embodiment of milling tool 1 in accordance with FIG. 4. Any same and functionally same elements are provided with the same reference characters, so that reference is made to the previous description in this respect. It can be particularly clearly discerned in FIG. 5 that this second example of an embodiment of milling tool 1 exhibits exactly three first front edges 9 but no second front edge 11. Furthermore, the example of an embodiment exhibits exactly three circumferential edges 31, whereby one of the circumferential edges 31 is assigned to each of the three first front edges 9, respectively, in which respective first front edge 9 in the area of cutting angles 19 changes over—by means of an arched configuration. It is also clearly discernible that first edge sections 13 of the three first front edges 9 jointly form centering tip 15.

Apart from that, open spaces 35, which are assigned to first edge sections 13, as well as open spaces 37, which are assigned to second edge sections 23, are depicted here. Naturally, the first example of an embodiment in accordance with FIGS. 1 through 3 exhibits appropriate open spaces, which are depicted in FIG. 3. Also emphasized is that appropriate open spaces 37 were obviously assigned to the second front edges 11 in both examples of an embodiment.

Figure 6:
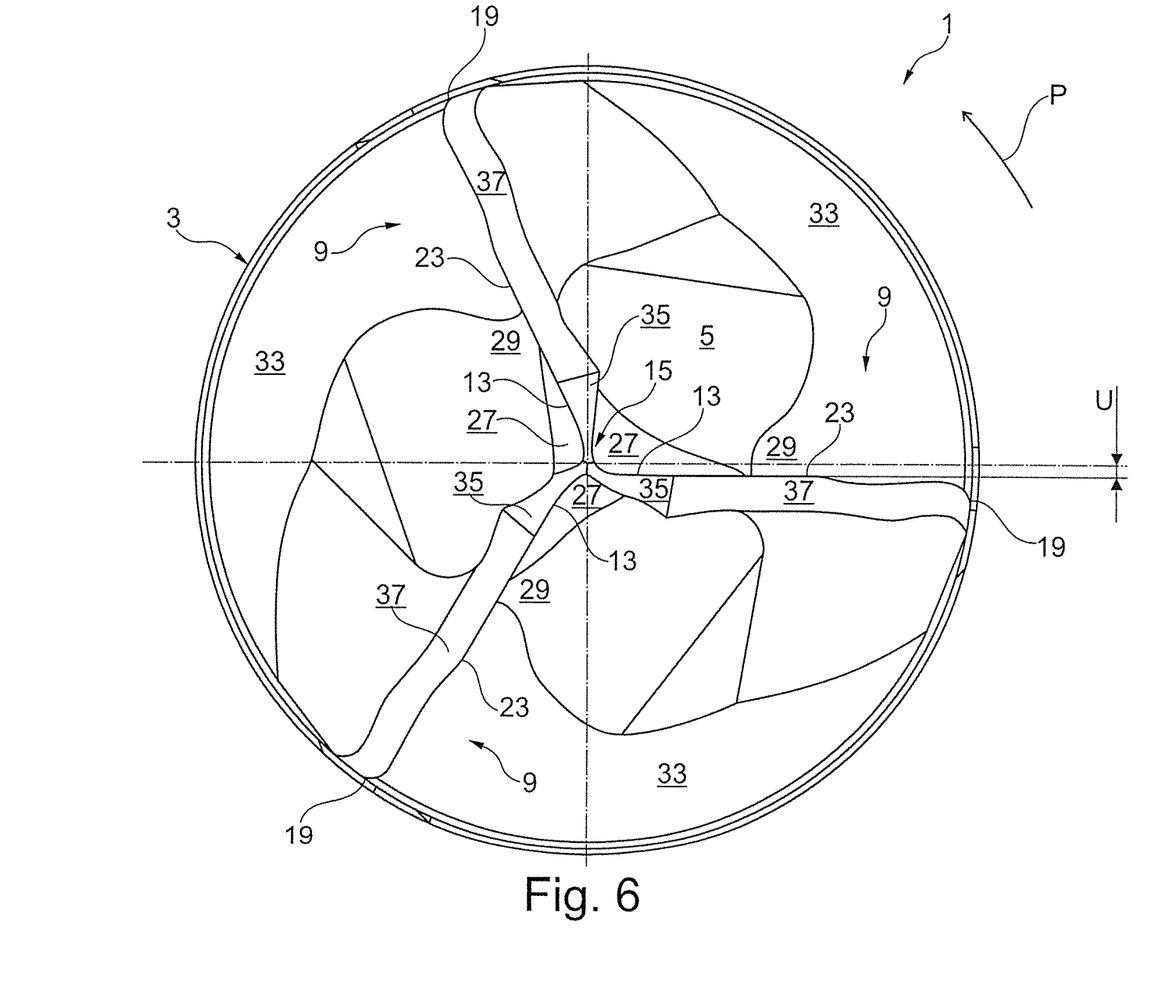

FIG. 6 shows a plan view onto front side 5 of the second example of an embodiment of milling tool 1 in accordance with FIGS. 4 and 5. Any same and functionally same elements are provided with the same reference characters, so that reference is made to the previous description in this respect. Thereby, the position below center U of second edge sections 23 of first front edges 9 is depicted in particular here.

On the whole it can be seen that using milling tool 1 as suggested here enables universal work by means of various advance directions—particularly from axial immersions, particularly so-called plunging, diagonal immersions, particularly so-called ramping, helical immersions, helical drilling up to conventional cutting—with high levels of performance, respectively. Thereby axially centering tip 15 arranged in a recessed manner as provided here provides for excellent stability and excellent centering characteristics during axial immersions in particular. At the same time, an interference into centering tip 15 through its axially recessed arrangement during diagonal immersions, particularly when ramping, as well as during conventional cutting processes of work pieces will be avoided.

The invention claimed is:

1. A milling tool comprising:
a base body,
the base body defining a central axis, and a front side, whereby
at least two geometrically defined first front edges arranged at the front side of base body, the at least two geometrically defined first front edges each exhibiting a first edge section facing the central axis, respectively,
the first edge sections of the at least two front edges being formed in an ascending fashion towards the central axis so that the first edge sections form a centering tip as an elevation, the centering tip rising towards a workpiece when the milling tool is positioned to process the workpiece,
the centering tip arranged in a recessed manner when compared with an axial outermost point of the at least two first front edges in an axial direction.

2. The milling tool according to claim 1, wherein the first front edges each exhibit a second edge section that is facing away from the central axis, respectively, which ascends to an imagined circumferential line of the base body.

3. The milling tool according to claim 2, wherein the second edge sections ascend in an arched and convex fashion towards the imagined circumferential line.

4. The milling tool according to claim 2, wherein the first front edges pass through a minimum in a transition area between the first edge sections and the second edge sections.

5. The milling tool according to claim 2, wherein first cutting faces are assigned to the first edge sections, whereby second cutting faces are assigned to the second edge sections, whereby the first cutting faces and the second cutting faces of each front edge comprise, respectively, between them at least partially an angle that is different from 0°.

6. The milling tool according to claim 1, wherein the milling tool when viewed in plan view onto the front side defines a center at the intersection of two orthogonal lateral axes, wherein at least a second edge section of the front edges, when viewed in plan view onto the front side exhibits a position below the center, whereby the position below the center is at least 0.2% up to a maximum of 2% of a diameter of the milling tool in the area of the front side.

7. The milling tool according to claim 1, wherein at least one of the at least two first front edges changes over into a circumferential edge that is arranged at a circumference of the base body.

8. The milling tool according to claim 1, wherein at least one of the at least two first front edges changes over via an arched configuration in a corresponding circumferential edge.

9. The milling tool according to claim 7, wherein more than two circumferential edges are arranged at the circumference of the base body, whereby at least a second front edge, which changes over in one of the circumferential edges, ends in a second edge section.

10. The milling tool according to claim 1, wherein the milling tool includes at least four circumferential edges and exactly two first front edges, or exactly three first front edges, or the milling tool includes exactly three circumferential edges, and exactly three first front edges as well as no second front edge.

11. The milling tool according to claim 1, wherein at least one of the first edge sections of the at least two first front edges when viewed in plan view includes a pre-center position, and wherein the pre-center position is a position leading by an offset, whereby the offset is at least 0.5% up to a maximum of 4% of a diameter of the milling tool in the area of the front side.

12. The milling tool according to claim 1, wherein a chip flute is assigned to the at least two front edges, respectively, whereby in a cross-section that is measured perpendicularly to the central axis, at least one of the chip flutes in the area of the front side is greater than in an area of the milling tool facing away from the front side.

13. The milling tool according to claim 1, wherein circumferential edges at the base body are arranged with unequal separation angles.

14. The milling tool according to claim 1, wherein at least two of circumferential edges (31) exhibit unequal angles of twist.

15. The milling tool according to claim 3, wherein the first front edges pass through a minimum in a transition area between the first edge sections and the second edge sections.

16. The milling tool according to claim 3, wherein first cutting faces are assigned to the first edge sections, whereby second cutting faces are assigned to the second edge sections, whereby the first cutting faces and the second cutting faces of each front edge comprise, respectively, between them at least in certain areas an angle that is different from 0°.

17. The milling tool according to claim 2, wherein the milling tool when viewed in plan view onto the front side defines a center at the intersection of two orthogonal lateral axes, wherein at least a second edge section of the front edges, when viewed in plan view onto the front side, exhibits a position below the center, whereby the position below the center is at least 0.2% up to a maximum of 2%, of a diameter of the milling tool in the area of the front side.

18. The milling tool according to claim 2, wherein at least one of the at least two first front edges changes over into a circumferential edge that is arranged at a circumference of the base body.

19. The milling tool according to claim 2, wherein at least one of the at least two first front edges changes over via an arched configuration in a corresponding circumferential edge.

20. The milling tool according to claim 19, wherein more than two circumferential edges are arranged at the circumference of the base body, whereby at least a second front edge, which changes over in one of the circumferential edges, ends in a second edge section.

21. The milling tool according to claim 1, wherein at least a second edge section of the front edges is arranged in a recessed manner by an offset with respect to an imagined diameter line of the milling tool extending substantially parallel to the second edge sections against a rotational direction of the milling tool, wherein the offset is at least 0.5% up to a maximum of 1.5% of the milling tool's diameter in the area of the front side.

22. The milling tool according to claim 1, wherein at least one of the first edge sections of the at least two first front edges when viewed in plan view includes a pre-center position, and wherein the pre-center position is a position leading by an offset, whereby the offset is at least 1% up to a maximum of 3% of a diameter of the milling tool in the area of the front side.

23. The milling tool according to claim 2, wherein at least a second edge section of the front edges is arranged in a recessed manner by an offset with respect to an imagined diameter line of the milling tool extending substantially parallel to the second edge sections against a rotational direction of the milling tool, wherein the offset is at least 0.5% up to a maximum of 1.5% of a diameter of the milling tool in the area of the front side.

* * * * *